United States Patent [19]
Aiken

[11] 3,734,598
[45] May 22, 1973

[54] LIQUID CRYSTAL DISPLAY DEVICE HAVING AN INCLINED REAR REFLECTOR

[75] Inventor: William Ross Aiken, Los Altos Hills, Calif.

[73] Assignee: Display Technology Corporation, Cupertino, Calif.

[22] Filed: Apr. 30, 1971

[21] Appl. No.: 139,022

[52] U.S. Cl............................350/160 LC, 350/267
[51] Int. Cl..............................................G02f 1/16
[58] Field of Search.......................350/160 LC, 267

[56] References Cited

UNITED STATES PATENTS

| | | | |
|---|---|---|---|
| 3,625,591 | 12/1971 | Freiser et al. | 350/150 |
| 3,499,112 | 3/1970 | Heilmeier et al. | 178/7.7 |

*Primary Examiner*—Edward S. Bauer
*Attorney*—Kurt A. Taüchen

[57] ABSTRACT

A display device settable between transparent and translucent or opaque conditions comprising a layer of a material changeable between light-transmitting and light-scattering conditions in response to electric fields, such as the liquid crystal materials, front and rear covers of transparent material containing said layer, each having a transparent film of a conductive material, means for setting up an electric field between said films through said layer, a source of light in front of the front cover of said layer, and an inclined mirror arrangement located behind the rear cover of said layer for directing light from said source obliquely through said layer from its rear face to its front face in such a manner that the source of light is concealed from view by an observer before the front face of said layer when said layer is in transparent light-transmitting condition. This inclined mirror arrangement reflects the light from the source of light obliquely through said layer in a direction in which it misses the observer's eyes. In this manner light from the source of light is removed from view by the observer when the layer is in transparent light-transmitting condition, yet is available for scattering and thus gives the layer a frosted or milky appearance when the layer of light transmission changing material is in light-scattering condition.

4 Claims, 3 Drawing Figures

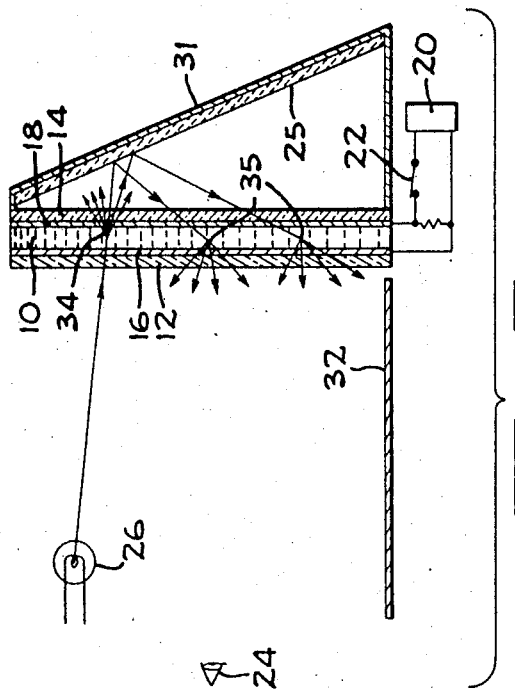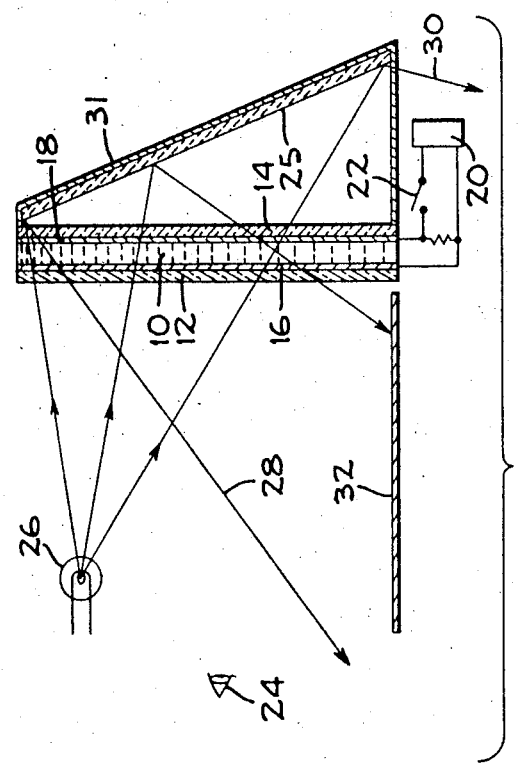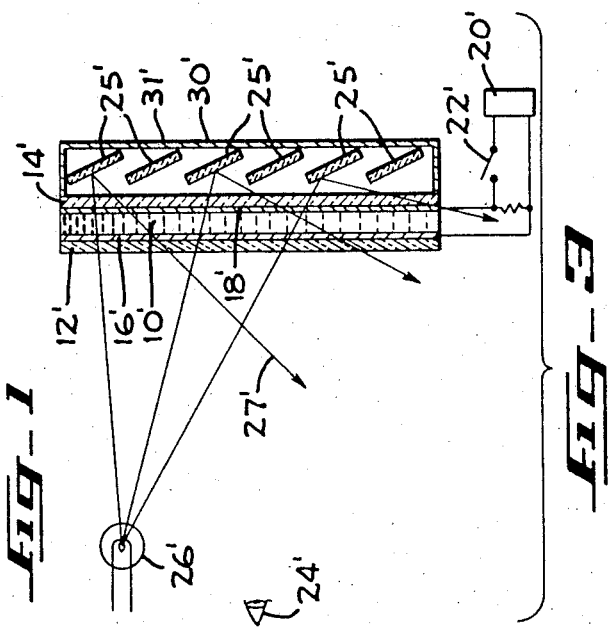

LIQUID CRYSTAL DISPLAY DEVICE HAVING AN INCLINED REAR REFLECTOR

The present invention relates to light control devices which are settable between transparent and opaque or partially opaque, i. e. translucent conditions, and which employ materials that are changeable between light-transmitting and light-scattering or light-reflecting conditions by the application and/or withdrawal of electric fields. Examples of such materials are liquid suspensions of dipolar or assymetric particles, or the substances known as "liquid crystal" materials. When light control devices of this type are employed in display apparatus intended to present sharply contrasting display fields to an observer, and are associated with sources of light to enhance the effect of their different display positions, there arises the problem that the sources of light become visible to the observer when the changeable material is in its light-transmitting or transparent condition, and may thus interfere with the integrity of the intended display. This problem is particularly pressing, though not exclusively so, in display devices employing layers of liquid crystal materials. These materials depend on a source of light for proper operation and can be changed to light-scattering, i. e. opaque or partially opaque condition only if the light passes from its source (or apparent source) through the layer of liquid crystal material in a forward direction, i. e. toward the viewer's eyes. They seem to remain in light-transmitting or transparent condition when the light travels through them in the opposite direction, i. e. away from the observer's eyes.

It is an object of my invention to provide a display device of the type described, that may be set from transparent to translucent or opaque condition, without interference with, or impairment of, its intended display in transparent condition.

More specifically, it is an object of the invention to provide a display device of the type employing liquid crystal material, which does not expose the source of light or present unwanted reflections of the observer and/or of his environment, when in transparent condition.

These and other objects of the present invention will be apparent from the following description of the accompanying drawings which show certain preferred embodiments thereof and wherein FIG. 1 is a schematic side elevation of a vertical section through a display device embodying my invention in its transparent condition;

FIG. 2 is a schematic side elevation similar to FIG. 1 of the same device in its opaque or translucent condition; and FIG. 3 is a schematic side elevation of a section through a modified embodiment of the invention.

In accordance with my invention I provide a display device of the type generally described above and which is equipped with a source of light located before its display face, with means that direct light from said source obliquely through the layer of light-transmission-changing material from the rear face to the display face thereof in a direction designed to miss the eye of the observer. This means is a mirror arrangement located on the side of the layer of light-transmission-changing material opposite to the source of light, which is inclined so that the light it reflects passes obliquely through the layer of light-transmission-changing material from the rear face to the front face thereof and misses the viewer's eye when the device is in transparent condition; hence no reflection from the space around and behind the observer will reach the viewer's eye; and yet when the device is energized, i. e. an electric field is established that is to set the layer of light-transmission-changing material to its translucent or opaque condition, the light passing from the mirror obliquely to and through said layer is scattered and gives said layer a frosted or milky and therefore opaque appearance in the observer's eyes.

Having first reference to FIG. 1 the reference numeral 10 designates a layer of a nematic liquid crystal material, such as anysylidene-p-aminophenylacetate, which is contained at either side by covers 12 and 14 of a transparent material, such as glass. It should be understood that the showing of the figure is schematic, and while the layer of liquid crystal material has been shown, for reasons of illustration, as being substantially greater in thickness than the containing covers 12 and 14, the opposite is usually true, and the described device may be produced by placing a drop of liquid crystal compound between two plates of glass to form a thin film of the liquid crystal compound therebetween. Both covers are provided with thin films 16 and 18 of a transparent electrically conductive material, such as transparent films of tin oxide. Both these films are connected to a source of electric power 20 through a switch 22. This source of power should supply from between 6 to 60 volts. The observer's position with regard to the display device is symbolically indicated by the eye 24. Arranged on the side of the display device opposite to the viewed front side of the device is a mirror 25 which is inclined relative to the rear face of the sandwich formed by layer 10 of liquid crystal material, the transparent covers 12, 14 and films 16 and 18. A source of light 26 is indicated in front of the device above the line of vision of viewer 24.

When the switch 22 is open as shown in FIG. 1, the device of the invention is fully transparent to the eye of the observer 24, and due to the inclination of the mirror 25 the light reflected by said mirror cannot reach the observer's eye, as illustrated by the beams 28 and 30 which represent the upper and lower limits of the shaft of light reflected by the mirror 25. The device of the invention may therefore be arranged to present a solid dark field to an observer 24 in deenergized condition, by simply covering its rear side and its flanks with a dark-surfaced enclosure indicated at 31. Since a good portion of the light reflected by the mirror 25 again passes through the device of the invention and may produce light images in front of the device in the area adjacent to bottom edge thereof, it may be of advantage to provide a black surface in front of the device near its bottom edge, as indicated at 32, to absorb such images and avoid any diversion on the viewer's part during the performance of the display device. Such a dark area 32 in front of the bottom edge of the device also prevents light received directly from the source of light 26 from being reflected through the layer 10 onto the inclined mirror 25 which could again reflect it through layer 10 directly into the observer's eyes.

Let it now be assumed that switch 22 is closed as shown in FIG. 2, setting up an electrostatic field that passes through the layer 10 of liquid crystal material. Light passing from source 26 through the layer of liquid crystal compound 10 will now scatter as indicated at 34 in FIG. 2, but this in itself would not be discernable by the viewer 24 who can only perceive the effects of "forward scattering", i. e. the scattering of light beams that pass from a source behind the layer of liquid crystal material through said layer in his general direction. However, a portion of the beams scattered as they pass initially through the layer of liquid crystal compound 10 are reflected by the inclined mirror 25 and again pass through the layer of liquid crystal material in the opposite direction and are now scattered a second time in "forward" direction with regard to the observer 24, as indicated at 35 in FIG. 2. The front face of the device of my invention, therefore, assumes a frosted or milky and hence opaque appearance. Thus, it is possible with the device of my invention by closure of switch 22 to change its display area for the observer 24 from a dark color into a frosted, opaque appearance.

The embodiment of the invention illustrated in FIG. 3 is essentially the same and operates on the same principles as the embodiment presented by FIGS. 1 and 2. It comprises a sandwich composed of a layer 10' of liquid crystal material contained by and between transparent covers 12' and 14' each provided with a transparent film of a conductive material 16' and 18' respectively. Means are provided in the form of a source of electric power 20' to establish an electrostatic field through the layer of crystal material 10' by closure of a switch 22'.

The embodiment of the invention illustrated in FIG. 3 differs from the embodiment represented by FIGS. 1 and 2 in respect of the mirror means which is intended to direct light received from a source of illumination 26' in front of the device in forward direction from points behind the rear cover 14' obliquely through the layer of crystal material 10' in such a manner that the light avoids, and is, therefore, not visible to, the observer's eyes. In the embodiment of the invention illustrated in FIG. 3 this mirror means is subdivided into a plurality of vertically superposed parallel, slanted mirrors in the form of relatively spaced, reflective slats 25' of sufficient inclination that even the light reflected by the uppermost slat represented by line 27' will pass through the layer of crystal material 10 in forward direction but will miss the observer's eye 24 when the device is in transparent condition. It will, however, scatter and present a frosted opaque appearance of layer 10' to the observer when the switch 22' is closed and an electrostatic field is set up between the electrically conductive films 16' and 18'. As in the embodiment of the invention illustrated in FIGS. 1 and 2, the mirror means 25' are covered by an enclosure 31' whose inner surfaces are dark so that the field presented to the observer when the switch 22' is open, and the layer of crystal material 10' is transparent, will appear to be black or at least dark. Over the embodiment represented by FIGS. 1 and 2, the embodiment of the invention illustrated in FIG. 3 has the advantage that it is of greater compactness due to the vertically superposed, subdivided mirror arrangement, which can be covered by a much more compact enclosure 31' than the enclosure 31 that is necessary to cover the inclined, continuate mirror 25 of FIGS. 1 and 2.

It will be obvious to the man skilled in the art that other light-control and display devices employing materials which change their light transmission characteristics in response to the presence and/or absence of electric fields, benefit from the inclined mirror arrangement of my invention, such as display devices making use of smectic or liquid crystal materials, and suspensions containing particles capable of being oriented into light-scattering, light-referring and/or light-passing positions by the application of electrostatic or electromagnetic fields.

In the appended claims the term "source of light" is intended to include ambient light on the side of the viewer.

I claim:

1. An adjustable display device comprising a layer of a material changeable between light-transmitting and light-scattering condition in response to an electric field and having a front face and a rear face, means for setting up an electric field through said layer, a source of light in front of said front face, and mirror means located behind and adjacent to the rear face of said layer in an inclined position relative thereto for directing light from said source through said layer obliquely from said rear face to said front face in a manner missing the eye of an observer in front of said front face.

2. A display device settable between transparent and translucent or opaque conditions comprising a layer of liquid crystal material having a front face and a rear face, means for setting up an electrostatic field through said layer, a source of light located in front of said front face, and a mirror means located behind and adjacent to the rear face of said layer in a inclined position relative thereto for directing light from said source obliquely through said layer from said rear face to said front face in a manner missing the eye of an observer before the front face of said layer.

3. A display device according to claim 2 wherein said mirror means comprises a series of vertically superposed, inclined, light-reflecting slats.

4. A display device relative to claim 2 including an enclosure arranged to cover said mirror means and having dark inner surfaces.

* * * * *